United States Patent [19]
Forster

[11] Patent Number: 5,769,751
[45] Date of Patent: Jun. 23, 1998

[54] HUB SYSTEM

[75] Inventor: Franz Forster, Karlstadt-Mühlbach, Germany

[73] Assignee: Linde Aktiengesellschaft, Germany

[21] Appl. No.: 531,629

[22] Filed: Sep. 21, 1995

[30] Foreign Application Priority Data

Sep. 23, 1994 [DE] Germany ................ 44 34 102.4

[51] Int. Cl.⁶ ........................................ F16H 57/08
[52] U.S. Cl. ................................ 475/346; 475/331
[58] Field of Search ...................... 475/331, 346; 180/372

[56] References Cited

U.S. PATENT DOCUMENTS

| | | | |
|---|---|---|---|
| 2,543,811 | 3/1951 | Snow et al. | 475/346 |
| 2,998,735 | 9/1961 | Elfes | 475/331 |
| 4,091,688 | 5/1978 | Huffman | 180/372 |
| 4,132,134 | 1/1979 | Avery et al. | 475/346 |
| 4,424,874 | 1/1984 | Koike et al. | 180/372 |
| 5,398,776 | 3/1995 | Forster | 180/308 |

FOREIGN PATENT DOCUMENTS

| | | | |
|---|---|---|---|
| 1210645 | 2/1966 | Germany | 475/331 |
| 6-159449 | 6/1994 | Japan | 475/331 |

*Primary Examiner*—Charles A. Marmor
*Assistant Examiner*—Sherry Lynn Estremsky
*Attorney, Agent, or Firm*—Webb Ziesenheim Bruening Logsdon Orkin & Hanson, P.C.

[57] ABSTRACT

A hub system which has a stationary hub carrier and a planetary gear with a web that functions as a rotating hub for supporting a wheel rim. Planet wheels are mounted on the web and a ring gear is connected to the stationary hub carrier and to a vehicle component. Two spaced bearings are positioned in an X-arrangement inside of the stationary hub carrier to rotationally mount the rotating hub on the stationary hub carrier. The bearings are biased with respect to each other by the connection between the stationary hub carrier and the vehicle component. A sun gear on a drive shaft is located in the planetary gear to engage the planet wheels and drive them around the ring gear.

17 Claims, 2 Drawing Sheets ns 5,769,751

HUB SYSTEM

BACKGROUND OF THE INVENTION

1. Field of the Invention

This invention relates to a hub system having a stationary hub carrier fixed to a vehicle component and a rotating hub mounted on the stationary hub carrier wherein the rotating hub is a web of a planetary gear having planet gears mounted thereon which engage a sun gear on a drive shaft and a ring gear on the stationary hub carrier.

2. Description of the Prior Art

The hub system disclosed in U.S. Pat. No. 5,398,776, issued Mar. 21, 1995, has a two-row angular ball bearing in a circular arrangement. The inner ring is a ring gear of a planet gear and has a fastening flange. This system is an integrated assembly, and although it has only a relatively few component parts, it is nevertheless somewhat difficult to manufacture.

SUMMARY OF THE INVENTION

An object of the invention is to create a hub system which is both easy and inexpensive to manufacture. This object is achieved by supporting the rotating hub on two angular contact roller bearings located in an X-arrangement inside of the stationary hub carrier. Conventional roller bearings of the angular contact type (e.g. ball bearings and conical roller bearings) can be used and can be easily biased without a separate fastening device, by the connection of the stationary hub carrier and the ring gear to a component which is non-detachably connected to a vehicle.

The outer races of the roller bearings are advantageously biased with respect to one another, whereby the outer race of one roller bearing is axially held against a shoulder on the stationary hub carrier, and the outer race of the other roller bearing is axially held against a shoulder on the ring gear.

In one advantageous arrangement of the invention, juxtaposed flanges extend radially outwardly on both the stationary hub carrier and the ring gear. Concentric holes are formed in the flange on the ring gear and are coaxial with holes formed in the flange on the stationary hub carrier. Threaded holes or threaded studs are located on the component fixed to the vehicle and are coaxial with the holes in the flanges. Bolts fasten the ring gear and the stationary hub carrier to the vehicle member and bias the two bearings.

The rotating hub is provided with concentric holes for receiving wheel mounting bolts. The mounting bolt holes are blind holes, so that when the wheel mounting bolts are removed, lubricants such as oil do not escape from the inside of the hub system. The diameter of the outer envelope of the holes is smaller than the diameter of the envelope including the roller bearings. In the hub systems of the prior art to which a wheel is mounted, the length of the mounting bolts equals the axial dimension of the bearings and the axial distance between the two bearings. The system of the invention results in a minimal axial dimension.

It is advantageous if the depth of the mounting bolt holes and the length of the wheel mounting bolts are sufficient for the simultaneous mounting of two adjacent wheel rims. Thus, dual twin tires can be fastened to the hub system without changing the wheel mounting bolts. In this case, the wheel mounting bolts do not extend very deep into the blind holes but still have a sufficient length threaded in the holes to fasten the rims to the rotary shaft.

It is also advantageous if a rotary shaft seal is located between the roller bearing which is farther from the planet wheels of the planet gear and the wheel plate. Because of its location, the rotary shaft seal can be removed after the wheel fastening bolts are loosened and the wheel rim(s) are removed without having to remove or disassemble the bearings or other components of the hub system. In conventional hub systems, it is generally necessary to remove the bearing, which eliminates the bias on the bearings. During reinstallation, the correct bias of the roller bearings must be reestablished which is a difficult and time-consuming procedure. Such is unnecessary when using the hub system of the invention.

The axial distance between the wheel plate and the end face of the stationary hub carrier is selected to provide a gap having a sufficient width to mechanically protect the rotary shaft seal.

A complete understanding of the invention will be obtained from the following description when taken in connection with the accompanying figure of drawing wherein like reference characters identify like parts throughout.

DESCRIPTION OF THE PREFERRED EMBODIMENT

Figure 1:
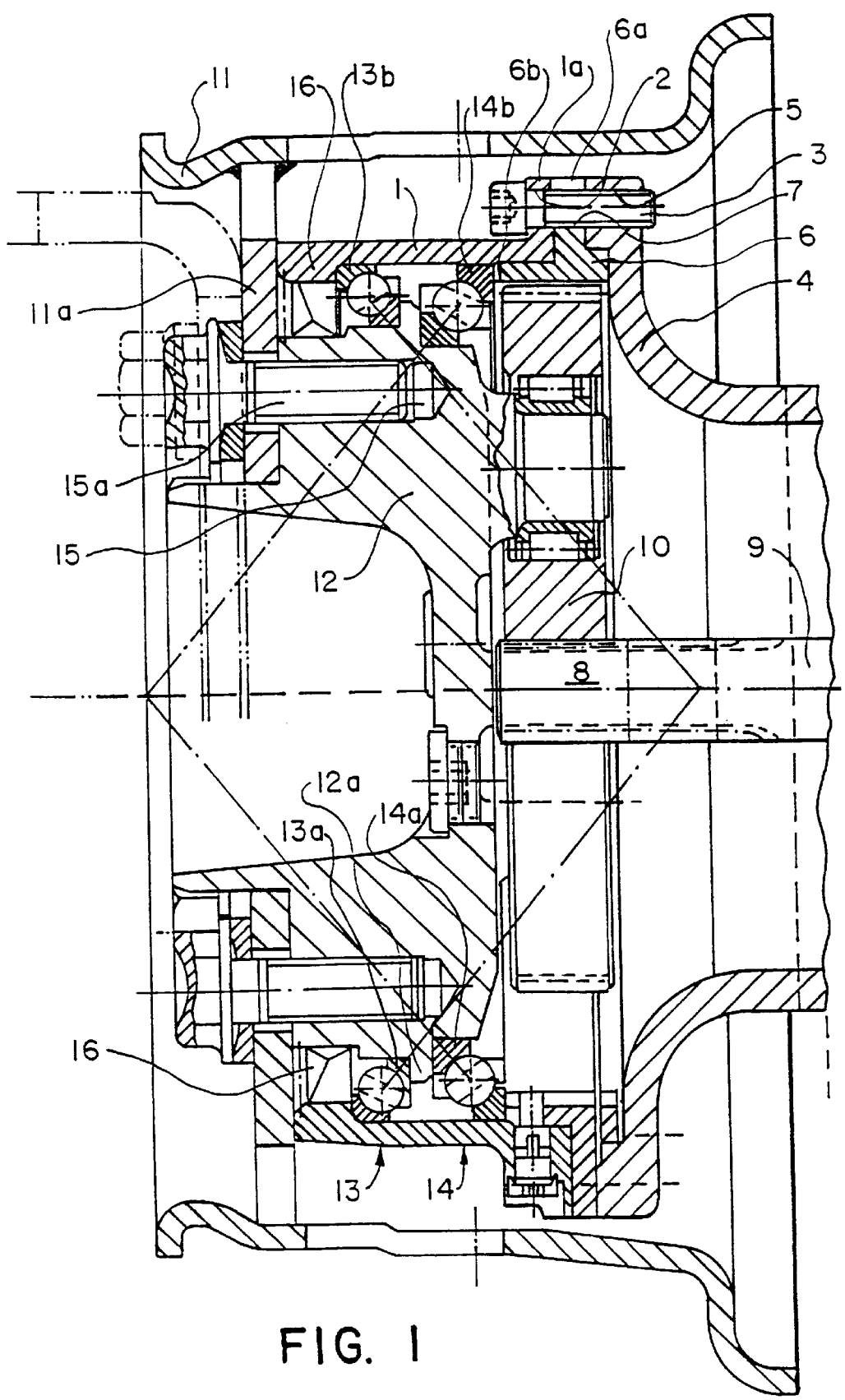
FIG. 1 is a longitudinal section through the hub system of the invention showing a first wheel rim in solid lines and a second wheel rim in broken lines and showing a pair of bearings in an X-arrangement.

The hub system has a stationary hub carrier 1, with an annular radial outwardly extending flange 1a on one end which is provided with concentric threaded holes 2 throughout the circumference to receive fastening bolts 3. A vehicle component 4 has an annular flange which is provided with threaded holes 5 which are coaxial with the holes 2 in the flange 1a. A ring gear 6 of a planet gear has an annular radial outwardly extending flange 6a located between the flange on the vehicle component 4 and the flange 1a on the stationary hub carrier 1. The radial flange 6a is provided with holes 7 distributed throughout the circumference which are coaxial with the holes 2 in flange 1a and the holes 5 in the flange of the vehicle component 4. The flange 6a of the ring gear 6 is located axially between the flange 1a of the stationary hub carrier 2 and a contact surface of the flange on the vehicle component 4. The ring gear 6 and the stationary hub carrier 1 are connected to the vehicle component 4 by a plurality of fastening bolts 3.

Figure 2:
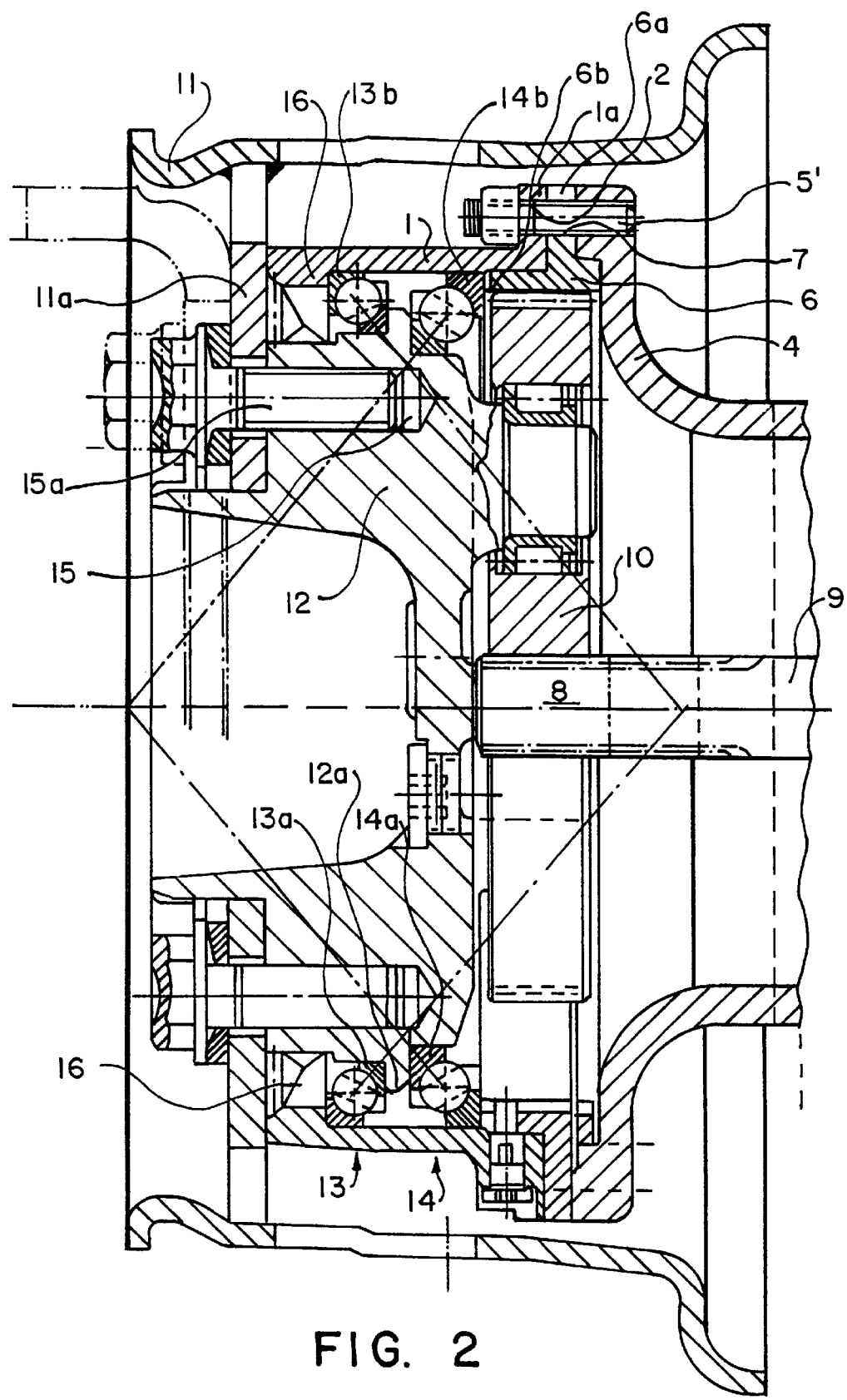
FIG. 2 is a longitudinal section through a modified hub system of the present invention.

The threaded holes 5 in the annular flange on the vehicle component 4 may be replaced with threaded axial studs 5'as shown in FIG. 2 which are connected to the annular flange on the vehicle component 4 and are coaxial with the holes in flanges 1a and 6a. In this arrangement, the ring gear 6 and the hub carrier 1 are held in place by nuts threaded on the ends of the studs 5'as shown in FIG. 2.

The ring gear 6 is part of a planet gear which has a sun gear 8 formed on one end of a drive shaft 9 which is the output shaft of a motor. Planet wheels 10 are located between the ring gear 6 and the sun gear 8 and are rotationally mounted on a web of the rotating hub 12 to which an annular wheel rim 11 can be fastened. The rotating hub 12 is rotationally mounted within the stationary hub carrier 1 by two axially spaced angular contact ball bearings 13 and 14 which are located in an X-arrangement.

As a result of the X-arrangement of bearings 13 and 14, it is possible to place the bearings 13 and 14 relatively close together axially, which minimizes the axial dimension of the hub system. Additionally, the X-arrangement of the bearings provides for easy installation of the bearings and easy application of a bias force to the bearings, as explained hereinafter. The inner races 13a and 14a of the ball bearings 13 and 14 abut a radial outward extension 12a on the rotating hub 12. If desired, a common inner race for both roller bearings may be provided. The outer race 13b of bearing 13 is biased toward the bearing 14 by a shoulder 1b on the stationary hub carrier 1 and the outer race 14b of bearing 14 abuts a shoulder 6b on the ring gear 6. The amount of the bias can be increased by inserting spacer rings between the shoulder 1b of the stationary hub carrier 1 and the outer race 13b of the bearing 13 and/or by inserting spacer rings between the shoulder 6b of the ring gear 6 and the outer race 14b of the bearing 14.

The rotating hub 12 is provided with concentric threaded blind holes 15 to receive threaded wheel mounting bolts 15a. The diameter of the outer envelope of the holes 15 is smaller than the diameter of the envelope including the bearings 13 and 14. The wheel mounting bolts 15a are thus located radially inside of the bearings which minimizes the radial dimension of the hub system.

The escape of lubricants from the inside of the hub system is prevented when the wheel mounting bolts 15a are removed from the holes 15 because the holes 15 are blind holes.

The depth of the holes 15 and the length of the wheel mounting bolts 15a are selected so that first and second wheel rims 11 can be fastened to the rotating hub 12 by the same wheel mounting bolts. It is therefore possible to fasten dual tires to the hub system without having to change the wheel mounting bolts. When two wheel rims are fastened to the rotary hub 12, the wheel mounting bolts extend less deeply into the holes 15 than when only a single wheel rim is fastened to the hub 12. The length of the bolt which is threaded in each hole is sufficient to provide a secure connection.

A rotary shaft seal 16 is located radially between the rotary hub 12 and the stationary hub carrier 1 and axially between the bearing 13 and the wheel plate 11a which is connected to the rotary hub. After the wheel mounting bolts 15a are removed along with the wheel rim 11 the rotary shaft seal 16 can be removed without having to remove or disassemble the bearings 13 and 14 and without disassembling or removing the planet gear. In conventional hub systems, it is generally necessary to remove the bearings to replace a seal in which case the bias between the bearings is eliminated. When the bearings are reinstalled, the correct bias must be reestablished which is a difficult and time-consuming procedure. Such is unnecessary in the hub system of the invention. The axial distance between the inner surface of the wheel plate 11a and the adjacent end surface of the stationary hub carrier 1 is designed to provide a slight gap so that the rotary shaft seal is protected from mechanical damage.

While one embodiment of the invention has been described in detail herein, it will be understood by those skilled in the art that various modifications and alternatives to the embodiment could be developed in light of the overall teachings of the disclosure. Accordingly, the particular arrangement shown in the drawing is illustrative only and is not limiting as to the scope of the invention which is to be given the full breadth of the appended claims and any and all equivalents thereof.

I claim:

1. A hub system for mounting a wheel, said hub system having a stationary hub carrier and a web of a planetary gear forming a rotating hub, planet wheels mounted on said web of said planetary gear; a ring gear connected to said stationary hub carrier and to a component adapted to be connected to a vehicle; two angular contact roller bearings positioned in an X-arrangement mounted inside said stationary hub carrier rotationally mounting said rotating hub on said stationary hub carrier, means for biasing said two angular roller bearings with respect to one another; and a sun gear on a drive shaft located in said planetary gear wherein each of said roller contact bearings has an outer race and said outer race of one of said angular contact roller bearings axially abutting against said stationary hub carrier and said outer race of the other of said angular contact roller bearing axially abutting against said ring gear, and wherein said angular contact roller bearings are positioned between said ring gear and said outer race which is abutting said stationary hub carrier.

2. A hub system as set forth in claim 1, wherein said means for biasing said two angular roller bearings is the connection of said ring gear to said stationary hub carrier and to a component adapted to be connected to a vehicle.

3. A hub system as set forth in claim 2, wherein said angular contact roller bearings are ball bearings which are positioned on one side of said ring gear.

4. A hub system as set forth in claimed in claim 1, including a radial outwardly extending flange on said stationary hub carrier and a radial outwardly extending flange on said ring gear, concentric threaded holes located in the circumference of each of said flanges, whereby said holes in said flange on said ring gear are coaxial with said holes in said flange on said stationary hub carrier, and one of threaded holes and threaded studs on the component adapted to be connected to the vehicle coaxial with said holes in said flanges.

5. A hub system as set forth in claim 4, wherein said angular contact roller bearings are ball bearings which are positioned on one side of said ring gear.

6. A hub system as set forth in claim 4, wherein said rotating hub is provided with concentrically spaced axial holes to receive wheel mounting bolts, and wherein the diameter of the outer envelope of said holes is smaller than the diameter of the inner envelope of said angular contact roller bearings.

7. A hub system as set forth in claim 1, wherein said angular contact roller bearings are ball bearings.

8. A hub system as set forth in claim 1, wherein said angular contact roller bearings are ball bearings which are positioned on one side of said ring gear.

9. A hub system as set forth in claim 8, wherein said rotating hub is provided with concentrically spaced axial holes to receive wheel mounting bolts, and wherein the diameter of the outer envelope of said holes is smaller than the diameter of the inner envelope of said angular contact roller bearings.

10. A hub system for mounting a wheel, said hub system having a stationary hub carrier and a web of a planetary gear forming a rotating hub, planet wheels mounted on said web of said planetary gear; a ring gear connected to said stationary hub carrier and to a component adapted to be connected to a vehicle; two angular contact roller bearings positioned in an X-arrangement mounted inside said stationary hub carrier rotationally mounting said rotating hub on said stationary hub carrier, means for biasing said two angular roller bearings with respect to one another; and a sun gear on a drive shaft located in said planetary gear, wherein said rotating hub is provided with concentrically spaced axial holes to receive wheel mounting bolts, and wherein the diameter of the outer envelope of said holes is smaller than the diameter of the inner envelope of said angular contact roller bearings.

11. A hub system as set forth in claim 10, wherein said spaced concentric axial holes are blind holes.

12. A hub system as set forth in claim 11, wherein the depth of concentrically said spaced axial holes and the length of said mounting bolts are sufficiently long for the joint fastening of a first wheel rim and a second wheel rim to said rotating hub.

13. A hub system as set forth in claim 11, wherein the depth of said spaced concentric axial holes and the length of said mounting bolts are sufficiently long for the joint fastening of a first wheel rim and a second wheel rim to said rotating hub.

14. A hub system as set forth in claim 13, including an annular radial outwardly extending wheel plate connected to said rotating hub and a rotary shaft seal located axially between said one angular contact roller bearing and said radial outwardly extending wheel plate.

15. A hub system as set forth in claim 10, including an annular radial outwardly extending wheel plate connected to said rotating hub and a rotary shaft seal located axially between said one angular contact roller bearing and said radial outwardly extending wheel plate.

16. A hub system as set forth in claim 15, wherein a surface of said wheel plate is axially spaced from the adjacent surface of said stationary hub carrier to form an axial gap between said surface of said wheel plate and said surface of said stationary hub carrier.

17. A hub system for mounting a wheel, said hub system having a stationary hub carrier and a web of a planetary gear forming a rotating hub, planet wheels mounted on said web of said planetary gear; a ring gear connected to said stationary hub carrier and to a component adapted to be connected to a vehicle; two angular contact roller bearings positioned in an X-arrangement mounted inside said stationary hub carrier rotationally mounting said rotating hub on said stationary hub carrier, means for biasing said two angular roller bearings with respect to one another; and a sun gear on a drive shaft located in said planetary gear, wherein each of said roller contact bearings has an outer race and said outer race of one of said angular contact roller bearings axially abutting against said stationary hub carrier and said outer race of the other of said angular contact roller bearing axially abutting against said ring gear, wherein said rotating hub is provided with concentrically spaced axial holes to receive wheel mounting bolts, and wherein the diameter of the outer envelope of said holes is smaller than the diameter of the inner envelope of said angular contact roller bearings.

* * * * *

UNITED STATES PATENT AND TRADEMARK OFFICE
CERTIFICATE OF CORRECTION

PATENT NO. : 5,769,751
DATED : June 23, 1998
INVENTOR(S) : Franz Forster

It is certified that error appears in the above-identified patent and that said Letters Patent is hereby corrected as shown below:

Column 2 Line 27 after "arrangement" delete comma and insert --; and--.

Column 2 Line 53 "5'as" should read --5', as--.

Column 2 Line 58 "5'as" should read --5', as--.

Claim 12 Column 5 Line 9 "in claim 11" should read --in claim 10--.

Claim 12 Column 5 Line 10 "concentrically said" should read --said concentrically--.

Claim 13, column 5, line 14, "in claim 11" should read --in claim 10--.

Claim 13 Column 5 Line 15 "said spaced concentric" should read --said concentrically spaced--.

Claim 14 Column 5 Line 19 "in claim 13" should read --in claim 12--.

Signed and Sealed this

Fifteenth Day of December, 1998

BRUCE LEHMAN

Attest:

Attesting Officer

Commissioner of Patents and Trademarks